United States Patent
Lin

(10) Patent No.: US 7,213,981 B2
(45) Date of Patent: May 8, 2007

(54) BACKLIGHT MODULE

(75) Inventor: Ming-Chuan Lin, Tai Chung (TW)

(73) Assignee: Wintek Corporation, Taichung (TW)

( * ) Notice: Subject to any disclaimer, the term of this patent is extended or adjusted under 35 U.S.C. 154(b) by 0 days.

(21) Appl. No.: 11/242,783

(22) Filed: Oct. 5, 2005

(65) Prior Publication Data

US 2006/0029355 A1    Feb. 9, 2006

Related U.S. Application Data

(63) Continuation-in-part of application No. 10/694,885, filed on Oct. 29, 2003, now abandoned.

(51) Int. Cl.
    *G02B 6/36* (2006.01)
    *G02B 6/26* (2006.01)
(52) U.S. Cl. .......................... 385/92; 385/52
(58) Field of Classification Search .................. 385/92, 385/52
    See application file for complete search history.

(56) References Cited

U.S. PATENT DOCUMENTS

| | | | |
|---|---|---|---|
| 6,448,955 B1 * | 9/2002 | Evanicky et al. | ........... 345/102 |
| 2003/0206179 A1 * | 11/2003 | Deering | ...................... 345/589 |
| 2004/0012726 A1 | 1/2004 | Kano et al. | |
| 2004/0032388 A1 * | 2/2004 | Tsai et al. | .................... 345/102 |
| 2004/0105055 A1 | 6/2004 | Yu et al. | |
| 2004/0114344 A1 | 6/2004 | Burtsev et al. | |
| 2005/0046768 A1 * | 3/2005 | Wu | ............................. 349/65 |
| 2005/0117368 A1 * | 6/2005 | Kim et al. | .................. 362/609 |
| 2005/0141065 A1 * | 6/2005 | Masamoto | ................... 359/15 |
| 2005/0253773 A1 * | 11/2005 | Sekiguchi | .................... 345/1.1 |

FOREIGN PATENT DOCUMENTS

JP    8-203310 A  *  8/1996

\* cited by examiner

*Primary Examiner*—Kaveh Kianni
(74) *Attorney, Agent, or Firm*—Birch, Stewart, Kolasch & Birch, LLP

(57) ABSTRACT

A backlight module having separate display regions includes integrally-farmed frames, a first and a second engaging structures, and multiple sets of optical components. The frames are constructed to define multiple accommodation spaces corresponding to the positions of the display regions, and the first engaging structure is provided on the frames. Each set of the optical components includes a light source, a light guide, a diffuser, and a brightness enhancing film. The second engaging structure is provided on the optical components and coupled to the first engaging structure.

9 Claims, 4 Drawing Sheets

BACKLIGHT MODULE

CROSS-REFERENCE TO RELATED APPLICATIONS

This application is a continuation-in part of application Ser. No. 10/694,885, filed on Oct. 29, 2003 now abandoned.

BACKGROUND OF THE INVENTION (a) Field of the Invention

The invention relates to a backlight module and, more particularly, to a backlight module used in a display device having separate display regions.

(b) Description of the Related Art

Recently, a display device having a plurality of separate display regions, such as a double-sided LCD, becomes more popular.

In the conventional design of the aforesaid display device, a set of optical components, such as a light guide, a diffuser and a brightness enhancing film, are combined with a LCD panel to constitute one of the display regions of the display device, where each set of the optical components is accommodated in an individual housing. Hence, as multiple sets of optical components are provided to constitute their respective display regions, a plurality of separate housings, clasped or bound with each other, are thus needed to result in a high manufacture cost. Further, the combination of separate housings in a backlight module accompanying with excess joints may decrease the structural strength and production yield of the backlight module.

BRIEF SUMMARY OF THE INVENTION

Hence, an object of the invention is to provide a backlight module to accommodate all sets of optical components prepared for separate display regions on a display device.

According to the invention, a one-piece housing of a backlight module includes an integrally-formed frames and an engaging structure formed on the frames. The integrally-formed frames are constructed to define a plurality of accommodation spaces corresponding to the positions of the separate display regions, and each of the accommodation spaces accommodates each set of the optical components a backlight module having separate display regions includes integrally-formed frames, a first and a second engaging structures, and multiple sets of optical components. The frames are constructed to define multiple accommodation spaces corresponding to the positions of the display regions, and the first engaging structure is provided on the frames. Each set of the optical components includes a light source, a light guide, a diffuser, and a brightness enhancing film. The second engaging structures is provided on the optical components and coupled to the first engaging structure.

Through the design of the invention, since the backlight module having a one-piece housing is used to accommodate all sets of optical components prepared for separate display regions, the manufacture cost is considerable reduced, the structural strength are inherently enhanced, and excess joints are thus eliminated to result in a high fabrication yield. Further, all engaging structures required for fixing all sets of optical components are integrated in the one-piece housing to result in a fine alignment for the assembly of a backlight module.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
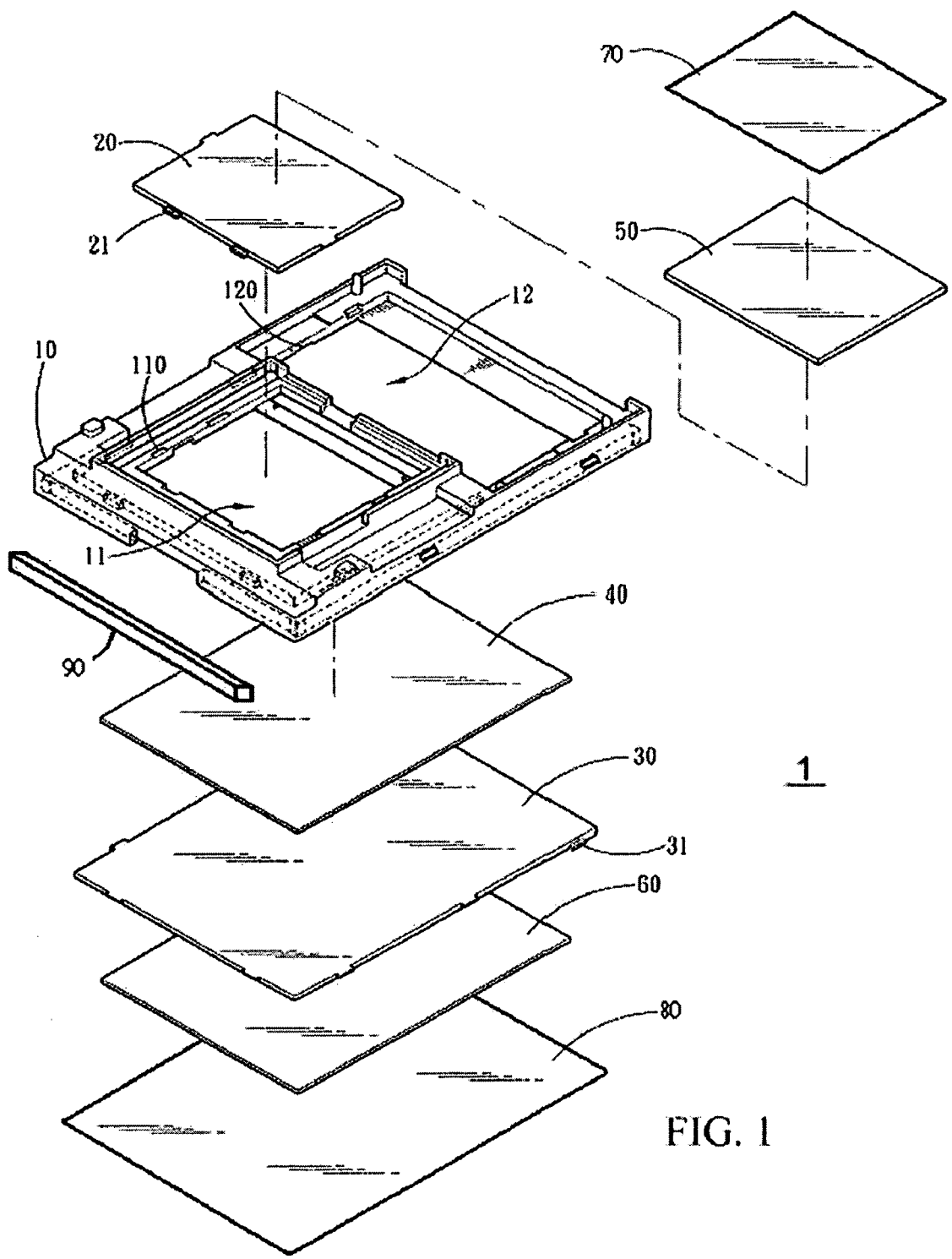
FIG. 1 shows an exploded view illustrating a backlight module of the invention.

FIG. 1 shows an exploded view illustrating a backlight module of the invention. Referring to FIG. 1, the backlight module 1 includes a one-piece housing 10, a first and a second light guides 20 and 30, a reflector 40, a first and a second diffusers 50 and 60, a first and a second brightness enhancement films (BEF) 70 and 80, and a light source 90.

Referring to FIG. 1, the one-piece housing 10 is constructed by integrally-formed frames that define a top accommodation space 11 and a bottom accommodation space 12. The first light guide 20, the first diffuser 50, and the first brightness enhancement films 70 are sequentially placed on the one-piece housing 10 to fill the top accommodation space 11. The inner edges of the one-piece housing 10 surrounding the top accommodation space 11 are provided with a plurality of notches 110, and the first light guide 20 has a plurality of protrusions 21, functioning as an engaging structure, formed on its sides. As a result, the first light guide 20 is firmly combined with the one-piece housing 10 when the protrusions 21 are inserted in the notches 110.

On the other hand, the second light guide 30, the second diffuser 60, and the second brightness enhancement film 80 are sequentially placed on the one-piece housing 10 to fill the bottom accommodation space 12. The inner edges of the one-piece housing 10 surrounding the bottom accommodation space 12 are provided with a plurality of notches 120, and the second light guide 30 has a plurality of protrusions 31, functioning as an engaging structure, formed on its sides. As a result, the second light guide 30 is firmly combined with the one-piece housing 10 when the protrusions 31 are inserted in the notches 120.

Further, a reflection plate 40 is arranged between the first light guide 20 and the second light guide 30 in the one-piece housing 10. The reflection plate 40 may be provided with reflection films on both its top surface and bottom surface to aid in enhancing the diffusing effect of the light guide and eliminating residual shadows. Also, a cold cathode fluorescent lamp (CCFL) 90 used as the light source of the backlight module 1 is placed in the housing 10 adjacent to the light guides 20 and 30.

Figure 2:
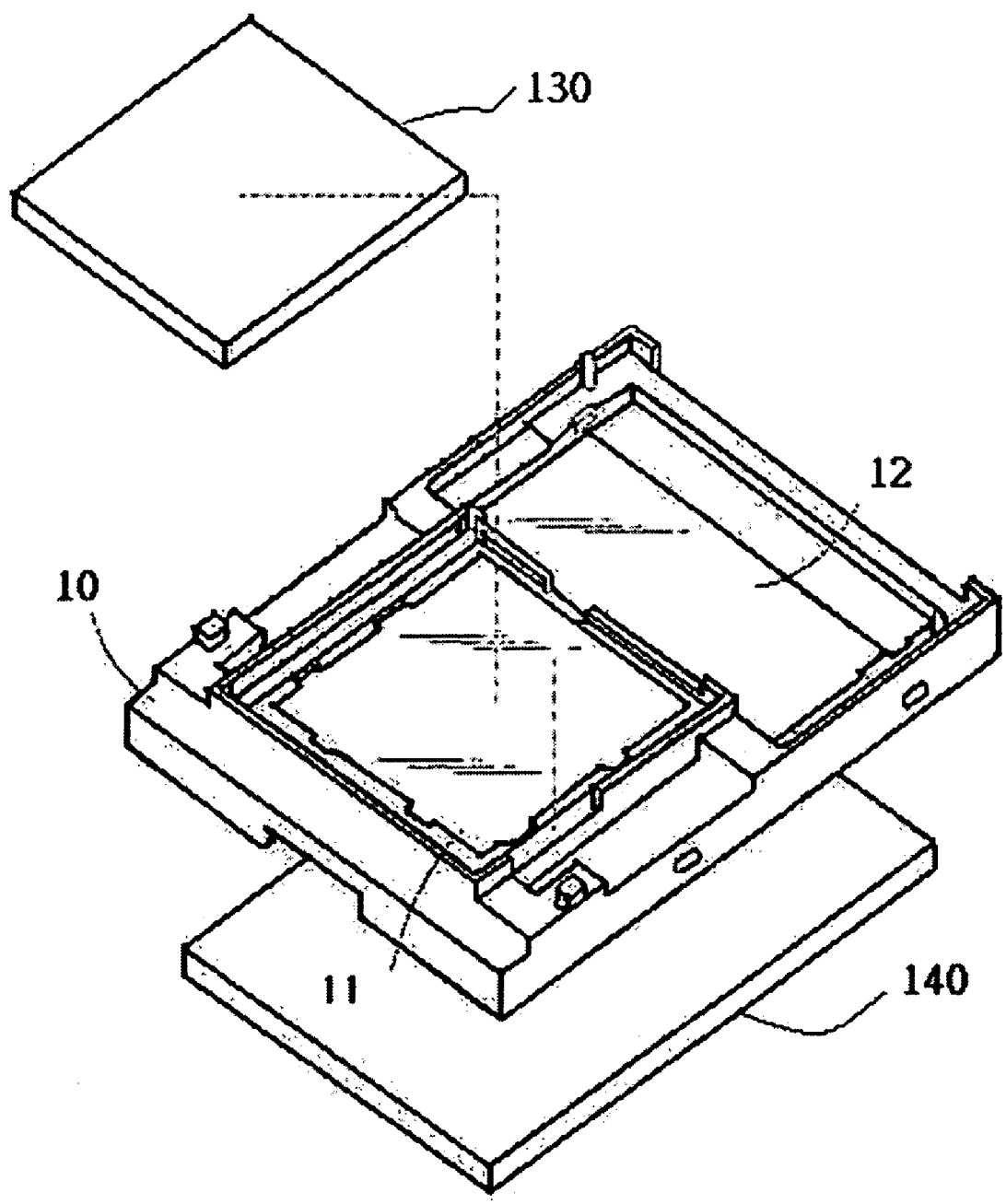
FIG. 2 shows a schematic diagram illustrating a backlight module where all optical components shown in FIG. 1 are assembled and accommodated in a one-piece housing of the invention.

FIG. 2 shows a schematic diagram illustrating a backlight module where all optical components shown in FIG. 1 are assembled and accommodated in a one-piece housing of the invention.

Referring to FIG. 2, the first and the second sets of the optical components shown in FIG. 1, which are respectively accommodated in the top accommodation space 11 and the bottom accommodation space 12, are respectively combined with a first LCD panel 130 and a second LCD panel 140 to form a top display region and a bottom display region. Hence, a double-sided display device having display regions separately on each of its opposite sides can be easily fabricated through the one-piece housing 10 of the invention.

In the conventional design, different sets of optical components prepared for their respective display regions are accommodated in separate housings, with the separate housings clasped or bound with each other, to result in a poor structural strength and high manufacture cost. However, through the design of the invention, since a one-piece housing is used to accommodate all sets of optical components prepared for separate display regions, the manufacture cost is considerable reduced, the structural strength are inherently enhanced, and excess joints are thus eliminated to result in a high fabrication yield. Further, all engaging structures required for fixing all sets of optical components are integrated in the one-piece housing to result in a fine alignment for the assembly of a backlight module.

Figure 3:
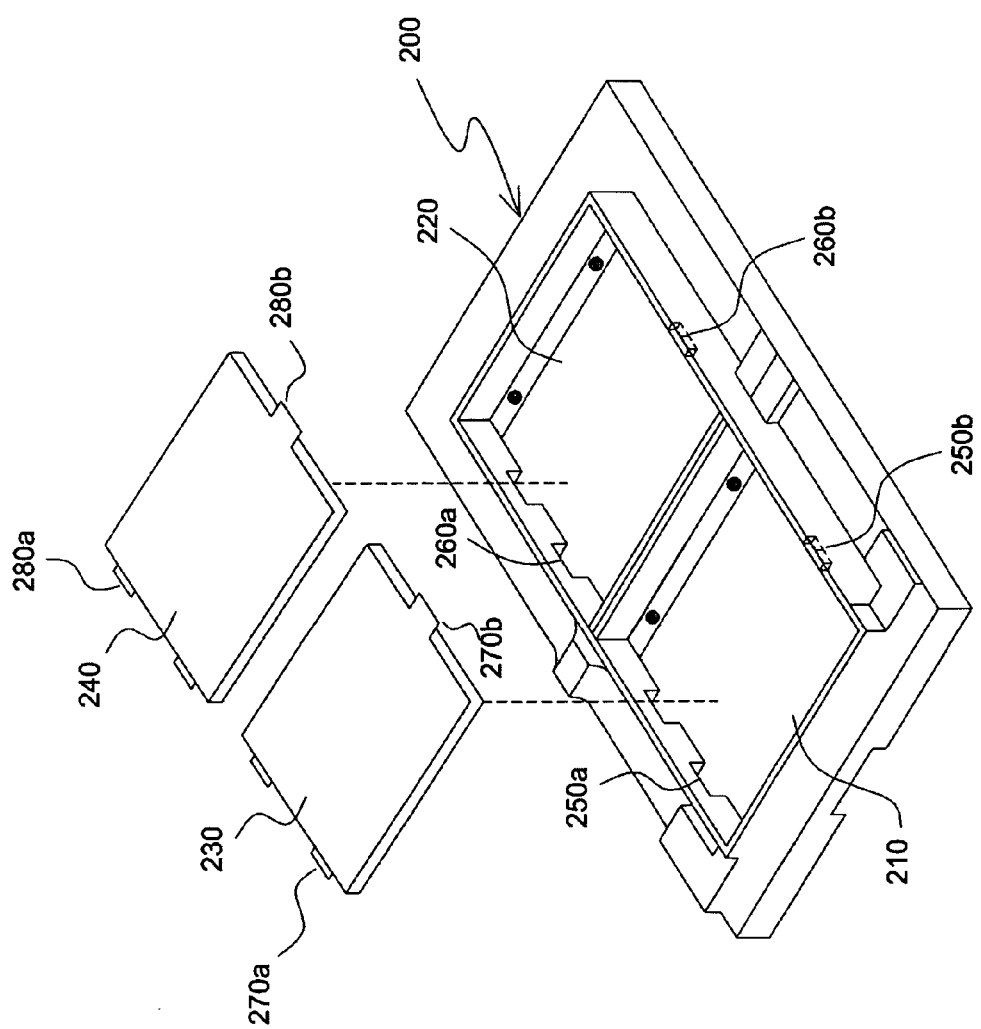
FIG. 3 shows a schematic diagram illustrating another embodiment of the one-piece housing according to the invention.

FIG. 3 shows a schematic diagram illustrating another embodiment of the one-piece housing according to the invention. Referring to FIG. 3, the one-piece housing 200 is constructed to define a left accommodation space 210 and a right accommodation space 220. A first light guide 230 and a second light guide 240 are respectively accommodated in the left and the right accommodation spaces to constitute separate display regions on the same side of a display device. Hence, it is clearly seen that the configuration of the inventive one-piece housing is not limited, and rather it can be adapted to conform to the locations of the display regions on a display device.

Further, the engaging structure formed on the one-piece housing includes, but is not limited to, notches 110 shown in FIG. 1 or slots shown in FIG. 3. Also, the location of the engaging structure formed on inner edges of the one-piece housing is not limited. For instance, the slot 250a formed on one inner edge of the housing may have a different horizontal level compared to the slot 250b formed on an opposite inner edge. In that case, the protrusions 270a provided on the front side of the light guide 230 may protrude from its bottom, while the protrusions 270b provided on the rear side of the light guide 230 may protrude from its top, so that the light guide may be affixed in the one-piece housing more stably.

Figure 4:
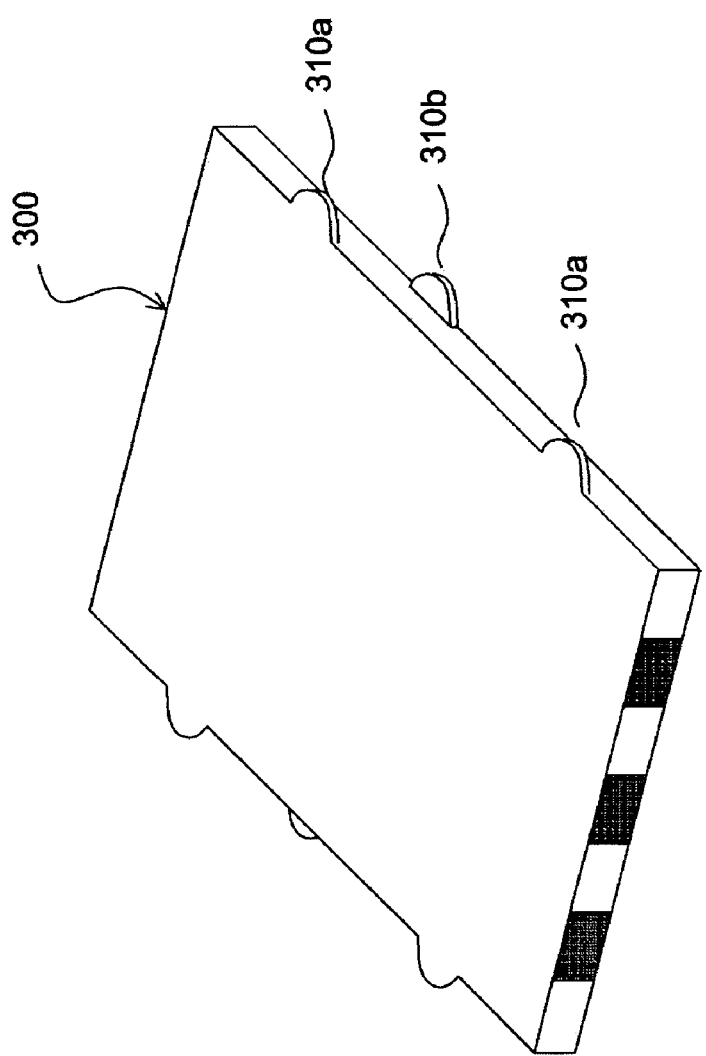
FIG. 4 shows a schematic diagram illustrating a light guide used in the backlight module of the invention.

Referring to FIG. 4, the shape of the protrusions 310a and 310b may be a semicircle to facilitate a smooth connection of the light guide and the one-piece housing. Note that the shape of the protrusion includes, but is not limited to, a rectangular shown in FIG. 3 or a semicircle shown in FIG. 4. It may be designed as any shape suitable for actual circumstances. Also, the protrusions 310a and 310b provided on the same side of the light guide 300 may locate at distinct horizontal levels to allow a more stable connection.

While the invention has been described by way of examples and in terms of the preferred embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A backlight module used in a display device having separate display regions, comprising:
   integrally-formed frames constructed to define a plurality of accommodation spaces corresponding to the positions of the display regions;
   a first engaging structure provided on the frames;
   a plurality sets of optical components, each set of the optical components being accommodated in each of the accommodation spaces and comprising at least a light source, a light guide, a diffuser, and a brightness enhancing film; and
   a second engaging structure provided on the optical components and coupled to the first engaging structure.

2. The backlight module as claimed in claim 1, wherein each set of the optical components further comprises a reflection plate.

3. The backlight module as claimed in claim 1, wherein the display regions are formed on two opposite sides of the display device.

4. The backlight module as claimed in claim 1, wherein the first engaging structure comprises a plurality of notches or slots formed on the frames.

5. The backlight module as claimed in claim 4, wherein the notches or slots provided on one side of one of the frames locate at distinct horizontal levels.

6. The backlight module as claimed in claim 1, wherein the second engaging structure comprises a plurality of protrusions formed on the optical components.

7. The backlight module as claimed in claim 6, wherein each of the protrusions has a shape of a rectangle.

8. The backlight module as claimed in claim 6, wherein each of the protrusions has a shape of a semicircle.

9. The backlight module as claimed in claim 6, wherein the protrusions provided on one side of one of the optical components locate at distinct horizontal levels.

* * * * *